United States Patent
Harashina et al.

(10) Patent No.: US 12,305,034 B2
(45) Date of Patent: May 20, 2025

(54) AUTOMOBILE INTERIOR COMPONENT MADE FROM POLYACETAL RESIN

(71) Applicant: Polyplastics Co., Ltd., Tokyo (JP)

(72) Inventors: Hatsuhiko Harashina, Shizuoka (JP); Tomohiro Monma, Shizuoka (JP); Akihiro Tamaoka, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 523 days.

(21) Appl. No.: 17/637,624

(22) PCT Filed: Jun. 9, 2020

(86) PCT No.: PCT/JP2020/022628
§ 371 (c)(1),
(2) Date: Feb. 23, 2022

(87) PCT Pub. No.: WO2021/059608
PCT Pub. Date: Apr. 1, 2021

(65) Prior Publication Data
US 2022/0275196 A1      Sep. 1, 2022

(30) Foreign Application Priority Data

Sep. 27, 2019    (JP) ................. 2019-176950

(51) Int. Cl.
*C08L 59/00*    (2006.01)

(52) U.S. Cl.
CPC .......... *C08L 59/00* (2013.01); *C08L 2666/34* (2013.01); *C08L 2666/36* (2013.01); *C08L 2666/78* (2013.01)

(58) Field of Classification Search
None
See application file for complete search history.

(56) References Cited

U.S. PATENT DOCUMENTS

| | | | |
|---|---|---|---|
| 6,753,363 B1 | 6/2004 | Harashina | |
| 2007/0054998 A1 | 3/2007 | Harashina | |
| 2007/0073007 A1 | 3/2007 | Harashina et al. | |
| 2010/0093901 A1 | 4/2010 | Kawaguchi et al. | |
| 2015/0299544 A1 | 10/2015 | Markgraf et al. | |
| 2016/0280852 A1 | 9/2016 | Masuda et al. | |
| 2021/0355314 A1 | 11/2021 | Tamaoka et al. | |

FOREIGN PATENT DOCUMENTS

| | | | | |
|---|---|---|---|---|
| CN | 1875066 A | 12/2006 | | |
| CN | 1878834 A | 12/2006 | | |
| EP | 2098569 A1 | * 9/2009 | ............... | C08K 5/13 |
| JP | 2003-192812 A | 7/2003 | | |
| JP | 2005-162913 A | 6/2005 | | |
| JP | 2005-163019 A | 6/2005 | | |
| JP | 2005-264102 A | 9/2005 | | |
| JP | 2006-045489 A | 2/2006 | | |
| JP | 2006-257166 A | 9/2006 | | |
| JP | 2008-031348 A | 2/2008 | | |
| JP | 2008-156489 A | 7/2008 | | |
| JP | 2008-260874 A | 10/2008 | | |
| JP | 2009-286874 A | 12/2009 | | |
| JP | 2010-006903 A | 1/2010 | | |
| JP | 2013-237742 A | 11/2013 | | |
| JP | 5616102 B2 | 10/2014 | | |
| JP | 2015-078387 A | 4/2015 | | |
| JP | 2015-514840 A | 5/2015 | | |
| JP | 2016-089069 A | 5/2016 | | |
| JP | 2017-082098 A | 5/2017 | | |
| JP | 2019-065233 A | 4/2019 | | |
| JP | 2020-100713 A | 7/2020 | | |
| WO | WO 2001/05888 A1 | 1/2001 | | |
| WO | WO 2005/044917 A1 | 5/2005 | | |
| WO | WO 2005/049728 A1 | 6/2005 | | |
| WO | WO 2013/156227 A1 | 10/2013 | | |
| WO | WO 2019/167463 A1 | 9/2019 | | |

OTHER PUBLICATIONS

Office Action issued in U.S. Appl. No. 17/593,231, mailed on Feb. 14, 2022.
Office Action issued in India Patent Application No. 202237009642 on May 28, 2024, in 6 pages.

* cited by examiner

*Primary Examiner* — Eli D. Strah
(74) *Attorney, Agent, or Firm* — KNOBBE, MARTENS, OLSON & BEAR LLP

(57) ABSTRACT

An automobile interior component obtained using a specific polyacetal resin composition which allows for stable suppression of the generation of mold deposits during molding at elevated temperatures, and the reduction of the amount of formaldehyde generated from a molded article to an extremely low level, as well as the prevention of the bleed-out of an added component from the molded article, and the retention of a favorable appearance of the molded article. The automobile interior component is obtained using a polyacetal resin composition containing, at least 100 parts by mass of a polyacetal polymer (A); 0.03 to 0.30 parts by mass of a hindered phenol antioxidant (B); 0.01 to 0.50 parts by mass of an aliphatic carboxylic acid hydrazide (C); 0.001 to 0.50 parts by mass of a hydantoin compound having two hydrazinocarbonylalkyl groups (D); and 0.001 to 0.30 parts by mass of an alkaline earth metal salt of an aliphatic carboxylic acid (E), and the total amount of the components (C) and (D) is 0.03 to 0.55 parts by mass with respect to 100 parts by mass of the polyacetal polymer (A).

1 Claim, No Drawings

AUTOMOBILE INTERIOR COMPONENT MADE FROM POLYACETAL RESIN

This application is the U.S. National Phase under 35 U.S.C. § 371 of International Application PCT/JP2020/022528, filed Jun. 9, 2020, designating the U.S., and published in Japanese as WO 2021/059608 on Apr. 1, 2021, which claims priority to Japanese Patent Application No. 2019-176950, filed Sep. 27, 2019, the entire content of which is incorporated herein by reference.

TECHNICAL FIELD

The present invention relates to an automobile interior component obtained using a specific polyacetal resin composition. The use of the specific resin composition of the present invention allows for stable suppression of the generation of mold deposits during the production of the automobile interior component via molding at elevated temperatures, and the reduction of the amount of formaldehyde generated from a molded article to an extremely low level, as well as the prevention of the bleed-out of an added component from the molded article, and the retention of a favorable appearance of the molded article.

BACKGROUND ART

As is well-known, polyacetal resins have been used in an extremely wide range of fields in recent years as a typical engineering resin excellent in physical properties such as mechanical properties and electrical properties, or chemical properties such as chemical resistance and thermal resistance. However, with the expansion of fields where the polyacetal resins are used, further improvements in their properties as a material have been demanded.

For example, a variety of materials are used in automobile interiors as materials for automobile components, and these materials may generate VOCs (an abbreviation of Volatile Organic Compounds). Since the VOCs contain a substance which may have adverse effects on the health of automobile occupants, regulations on the concentration of the VOCs in the automobile cabin have been issued in recent years, similarly to those on housings, etc.

In the polyacetal resins, formaldehyde, one of the VOCs, may be generated. Since formaldehyde is a substance to be regulated with respect to the VOC concentration in the automobile cabin and an odorous substance, the reduction of the generation of formaldehyde has been required.

The polyacetal resins have various excellent properties, and molded articles therefrom have been used in a wide variety of fields, but the polyacetal resins are characterized by easy decomposition under heating and oxidizing atmospheres, or acidic or alkaline conditions due to their characteristic features in their chemical structures.

Therefore, problems with respect to the polyacetal resins include an increase in thermal stability of the polyacetal resins, and a reduction of the generation of formaldehyde during the molding process or from the molded articles. With low thermal stability, a polymer will be decomposed by heat during processing steps such as extrusion, molding, or the like, resulting in the generation of deposits on a mold (mold deposits), and impaired moldability, mechanical properties and the like.

Thus, in order to stabilize the polyacetal resins, an antioxidant and/or other stabilizers are added thereto. Known antioxidants to be added to the polyacetal resins include sterically-hindered phenol compounds (hindered phenols), sterically-hindered amine compounds (hindered amines), and the like, and other stabilizers for use include melamine, polyamides, alkali metal hydroxides and alkaline earth metal hydroxides and the like. The antioxidant is typically used in combination with another stabilizer.

However, it is difficult to significantly reduce the amount of formaldehyde generated, especially formaldehyde generated from molded products, simply by adding such general-purpose stabilizers to polyacetal resins having normal formaldehyde quality. Further, polyacetal resin compositions to which various compounds are added have been disclosed in order to solve the problems described above and reduce the amount of formaldehyde generated.

For example, a technology has been disclosed which involves a combined use of a polyacetal resin having a specific end group, a hindered phenol antioxidant, a hydrazide compound and an isocyanate compound (Patent Document 1). In addition, a technology has also been disclosed which involves the coexistence of a hindered phenol antioxidant, a hydrazide compound and an alkaline earth metal salt of a specific carboxylic acid (Patent Document 2).

Patent Document 1: Japanese Unexamined Patent Application, Publication No. 2009-286874

Patent Document 2: Japanese Unexamined Patent Application, Publication No. 2006-45489

DISCLOSURE OF THE INVENTION

Problems to be Solved by the Invention

When a molded article is used as an automobile component, especially when the molded article is used as an automobile interior component, the appearance of the molded article should be favorably retained; however, according to the prior art, it is difficult to completely prevent the bleed-out of the added components from the molded article when the automobile cabin temperature and humidity rise.

In addition, there is a strong need to improve the productivity in the production of automobile components, and attempts have been made to improve the molding productivity by increasing resin flowability during molding, and molding at higher temperatures has been pursued. However, the high-temperature molding generates the mold deposits more heavily, and additionally exerts an insufficient suppressive effect on the amount of formaldehyde generated from the molded articles.

An object of the present invention is to propose a specific polyacetal resin composition which allows for stable suppression of the generation of mold deposits during molding at elevated temperatures, and the reduction of the amount of formaldehyde generated from a molded article to an extremely low level, as well as the prevention of the bleed-out of an added component from the molded article, and the retention of a favorable appearance of the molded article, and to provide an automobile interior component including the polyacetal resin composition.

Means for Solving the Problems

The object of the present invention was achieved by the following.

A first aspect of the present invention provides an automobile interior component, wherein the automobile interior component is obtained using a polyacetal resin composition containing, at least:

100 parts by mass of a polyacetal polymer (A);
0.03 to 0.30 parts by mass of a hindered phenol antioxidant (B);
0.01 to 0.50 parts by mass of an aliphatic carboxylic acid hydrazide (C);
0.001 to 0.50 parts by mass of a hydantoin compound having two hydrazinocarbonylalkyl groups (D), and
0.001 to 0.30 parts by mass of an alkaline earth metal salt of an aliphatic carboxylic acid (E),
wherein
the total amount of the components (C) and (D) is 0.03 to 0.55 parts by mass with respect to 100 parts by mass of the polyacetal polymer (A).

A second aspect of the present invention provides the automobile interior component according to the first aspect, wherein the aliphatic carboxylic acid hydrazide (C) is sebacic acid dihydrazide.

A third aspect of the present invention provides the automobile interior component according to the first or second aspect, wherein the alkaline earth metal salt of an aliphatic carboxylic acid (E) is at least one selected from calcium stearate and calcium 12-hydroxystearate.

A fourth aspect of the present invention provides the automobile interior component according to any one of the first to third aspects, wherein the hydantoin compound having two hydrazinocarbonylalkyl groups (D) is 1,3-bis (hydrazinocarbonoethyl)-5-isopropylhydantoin.

Effects of the Invention

According to the present invention, a specific polyacetal resin composition which allows for stable suppression of the generation of mold deposits during molding at elevated temperatures, and the reduction of the amount of formaldehyde generated from a molded article to an extremely low level, as well as the prevention of the bleed-out of an added component from the molded article, and the retention of a favorable appearance of the molded article is proposed, and an automobile interior component including the polyacetal resin composition is provided.

PREFERRED MODE FOR CARRYING OUT THE INVENTION

Hereinafter, the present invention will be described in detail.

<Polyacetal Polymer (A)>

A polyacetal polymer (A) used in an embodiment of the present invention may be a homopolymer having an oxymethylene group ($-OCH_2-$) as a constituent unit, or a copolymer having other comonomer units in addition to the oxymethylene unit, with the copolymer being preferred.

Generally, the polyacetal polymer (A) is produced by copolymerizing formaldehyde or a cyclic compound of formaldehyde as a principal monomer with a compound selected from a cyclic ether and a cyclic formal as a comonomer, and is typically stabilized by eliminating a labile moiety at an end through thermal decomposition, (alkali) hydrolysis or the like.

In particular, trioxane, which is a cyclic trimer of formaldehyde, is generally used as the principal monomer. The trioxane is generally obtained by reacting an aqueous formaldehyde solution in the presence of an acidic catalyst, and used after purification by way of distillation and the like. The trioxane to be used in the polymerization preferably has as low content of impurities such as water, methanol, formic acid and the like as possible.

As the comonomer, general cyclic ethers and cyclic formals, and glycidyl ether compounds capable of forming a branched structure or a cross-linked structure, etc. may be used alone or in combinations of two or more thereof.

The polyacetal copolymer as described above can be generally obtained by cationic polymerization using a cationic polymerization catalyst with the addition of an appropriate amount of a molecular weight modifier. The molecular weight modifier, the cationic polymerization catalyst, the polymerization process, the polymerization apparatus, the deactivation treatment of the catalyst after the polymerization, the end-stabilization treatment of a crude polyacetal copolymer obtained in the polymerization, and the like, which are used for the purpose of the present invention, are known and well-documented, and basically, any known materials and treatments may be employed.

The molecular weight of the polyacetal copolymer used in the embodiment of the present invention is not particularly limited, but the polyacetal copolymer preferably has a weight-average molecular weight of about 10,000 to 400,000 as determined by size exclusion chromatography (SEC) in terms of polymethyl methacrylate (PMMA) equivalent.

Additionally, the polyacetal polymer (A) preferably has a melt index (measured according to ASTM-D1238 at 190° C. under a load of 2.16 kg), which is a measure of the flowability of the resin, of 0.1 to 100 g/10 min, and more preferably 0.5 to 80 g/10 min.

The polyacetal polymer (A) used in the embodiment of the present invention particularly preferably has specific end group properties. Specifically, the amount of a hemiformal end group in the polyacetal polymer (A) is 1.0 mmol/kg or less, the amount of a formyl end group in the polyacetal polymer (A) is 0.5 mmol/kg or less, and the amount of a labile end group in the polyacetal polymer (A) is 0.5% by mass or less.

As used herein, the hemiformal end group is represented by $-OCH_2OH$, and may be also referred to as a hydroxymethoxy group or a hemiacetal end group. The formyl end group is represented by $-OCHO$. The amount of such hemiformal and formyl end groups can be determined by $^1H$-NMR measurement, and a specific measurement method therefor can refer to the method described in Japanese Unexamined Patent Application, Publication No. 2001-11143.

Further, the amount of the labile end group refers to the amount of a moiety that is present in the end portion of the polyacetal polymer and is labile to heat and/or a base and susceptible to decomposition. The amount of such a labile end group is determined according to the following quantitative determination method and expressed as % by mass relative to the polyacetal copolymer: specifically, 1 g of the polyacetal copolymer together with 100 mL of a 50% by volume aqueous methanol solution containing 0.5% by volume ammonium hydroxide is charged into a pressure-resistant sealed vessel, the mixture is heat-treated at 180° C. for 45 min, followed by cooling, and the vessel is opened to obtain a solution, and the amount of formaldehyde that has been generated via the decomposition of the polyacetal copolymer and dissolved in the solution is quantitatively determined.

The polyacetal polymer (A) used in the embodiment of the present invention preferably has the hemiformal end group in an amount of 1.0 mmol/kg or less, and more preferably 0.6 mmol/kg or less. In addition, the polyacetal polymer (A) has the formyl end group in an amount of preferably 0.5 mmol/kg or less, and more preferably 0.1 mmol/kg or less.

Further, the polyacetal polymer (A) preferably has the labile end group in an amount of preferably 0.5% by mass or less, and more preferably 0.3% by mass or less. The lower limits of the amounts of the hemiformal end group, the formyl end group, and the labile end group are not particularly limited.

The polyacetal polymer (A) having the specific end properties as described above can be produced by reducing impurities in the monomer and comonomer, selecting a production process, and optimizing its production conditions, etc.

In the following, as a method for producing a polyacetal polymer (A) having the specific end properties that satisfy the requirements of the present invention, for example, the method described in Japanese Unexamined Patent Application, Publication No. 2009-286874 may be employed. However, the method for producing such a polyacetal polymer (A) is not limited to this method.

In the embodiment of the present invention, a polyacetal resin having a branched or cross-linked structure may be added to and used with the polyacetal polymer (A), in which case the amount of the former added is 0.01 to 20 parts by mass, and particularly preferably 0.03 to 5 parts by mass with respect to 100 parts by mass of the polyacetal polymer (A).

<(B) Hindered Phenol Antioxidant>

A hindered phenol antioxidant (B) which can be used in the embodiment of the present invention is not particularly limited, and examples thereof include: monocyclic hindered phenol compounds (for example, 2,6-di-t-butyl-p-cresol, and the like); polycyclic hindered phenol compounds having rings linked by a hydrocarbon group or a group that includes a sulfur atom (for example, 2,2'-methylenebis(4-methyl-6-t-butylphenol), 4,4'-methylenebis(2,6-di-t-butylphenol), 1,1, 3-tris(2-methyl-4-hydroxy-5-t-butylphenyl)butane, 4,4'-butylidenebis(3-methyl-6-t-butylphenol), 1,3,5-trimethyl-2, 4,6-tris(3,5-di-t-butyl-4-hydroxybenzyl)benzene, 4,4'-thiobis(3-methyl-6-t-butylphenol), and the like); hindered phenol compounds having an ester group or an amide group (for example, n-octadecyl-3-(4'-hydroxy-3',5'-di-t-butylphenyl)propionate, n-octadecyl-2-(4'-hydroxy-3',5'-di-t-butylphenyl)propionate, 1,6-hexanediol bis[3-(3,5-di-t-butyl-4-hydroxyphenyl)propionate], triethylene glycol bis [3-(3-t-butyl-5-methyl-4-hydroxyphenyl)propionate] (also known as ethylenebis(oxyethylene) bis[3-(5-t-butyl-4-hydroxy-m-tolyl)propionate], pentaerythritol tetrakis[3-(3,5-di-t-butyl-4-hydroxyphenyl)propionate], 3,9-bis{2-[3-(3-t-butyl-4-hydroxy-5-methylphenyl)propionyloxy]-1,1-dimethylethyl}-2,4,8,10-tetraoxaspiro[5.5]undecane, 2-t-butyl-6-(3'-t-butyl-5'-methyl-2'-hydroxybenzyl)-4-methylphenyl acrylate, 2-[1-(2-hydroxy-3,5-di-t-pentylphenyl)ethyl]-4,6-di-t-pentylphenyl acrylate, di-n-octadecyl-3,5-di-t-butyl-4-hydroxybenzylphosphonate, N,N'-hexamethylenebis(3,5-di-t-butyl-4-hydroxy-dihydrocinnamamide), N,N'-ethylenebis[3-(3,5-di-t-butyl-4-hydroxyphenyl)propionamide], N,N'-tetramethylenebis[3-(3, 5-di-t-butyl-4-hydroxyphenyl)propionamide], N,N'-hexamethylenebis[3-(3,5-di-t-butyl-4-hydroxyphenyl) propionamide], N,N'-ethylenebis[3-(3-t-butyl-5-methyl-4-hydroxyphenyl)propionamide], N,N'-hexamethylenebis[3-(3-t-butyl-5-methyl-4-hydroxyphenyl)propionamide], N,N'-bis[3-(3,5-di-t-butyl-4-hydroxyphenyl)propionyl]hydrazine, N,N'-bis[3-(3-t-butyl-5-methyl-4-hydroxyphenyl)propionyl]hydrazine, 1,3,5-tris(3,5-di-t-butyl-4-hydroxybenzyl) isocyanurate, 1,3,5-tris(4-t-butyl-3-hydroxy-2,6-dimethylbenzyl) isocyanurate, and the like).

These hindered phenol antioxidants may be used alone or in combinations of two or more thereof. The amount of the hindered phenol antioxidant added is 0.01 to 3 parts by mass with respect to 100 parts by mass of the polyacetal polymer (A).

<Aliphatic Carboxylic Acid Hydrazide (C)>

An aliphatic carboxylic acid hydrazide (C) used in the embodiment of the present invention is exemplified by adipic acid dihydrazide, sebacic acid dihydrazide, dodecanedioic acid dihydrazide, stearic acid hydrazide, and the like. Sebacic acid dihydrazide may be mentioned as a preferable one; it scavenges formaldehyde and furthermore, when used in combination with a hydantoin compound having two hydrazinocarbonylalkyl groups, can significantly reduce mold deposits which may be otherwise generated.

In the embodiment of the present invention, the amount of the component (C) added with respect to 100 parts by mass of the polyacetal polymer (A) is 0.01 to 0.50 parts by mass, preferably 0.02 to 0.30 parts by mass, and even more preferably 0.10 to 0.30 parts by mass.

<Hydantoin Compound Having Two Hydrazinocarbonylalkyl Groups (D)>

A hydantoin compound having two hydrazinocarbonylalkyl groups (D) (hereinafter, may be abbreviated to "hydantoin compound") in the embodiment of the present invention is exemplified by 1,3-bis(hydrazinocarbonoethyl)hydantoin, 1,3-bis(hydrazinocarbonoethyl)-5-methylhydantoin, 1,3-bis(hydrazinocarbonoethyl)-5,5-dimethylhydantoin, 1,3-bis(hydrazinocarbonoethyl)-5-isopropylhydantoin, and the like, and the hydantoin compound may have one or two substituent(s) (a linear or branched alkyl group having 1 to 6 carbon atoms such as a methyl group, an aryl group having 6 to 10 carbon atoms such as a phenyl group, and the like) in 5-position of the hydantoin, and the two substituents in 5-position may form a ring together with the carbon atom in 5-position. Preferably, 1,3-bis(hydrazinocarbonoethyl)-5-isopropylhydantoin is used.

This hydantoin compound (D) of the embodiment of the present invention suppresses mold deposits under high-temperature molding conditions and prevents the bleed-out of an added component from a molded article when used in combination with the aliphatic carboxylic acid hydrazide (C) of the embodiment of the present invention. In particular, significant effects can be found when the hydantoin compound (D) is used in combination with sebacic acid dihydrazide.

In the embodiment of the present invention, the amount of the hydantoin compound (D) added with respect to 100 parts by mass of the polyacetal polymer (A) is 0.001 to 0.50 parts by mass, and preferably 0.01 to 0.30 parts by mass.

In the embodiment of the present invention, when both the aliphatic carboxylic acid hydrazide (C) and the hydantoin compound (D) are contained, the effects of the invention can be exerted, but the total amount of the aliphatic carboxylic acid hydrazide (C) and the hydantoin compound (D) with respect to 100 parts by mass of the polyacetal polymer (A) is preferably 0.03 to 0.55 parts by mass. In addition, the mass ratio of the components (C) and (D) contained is preferably (C):(D)=10:90 to 99:1.

<Alkaline Earth Metal Salt of Aliphatic Carboxylic Acid (E)>

An aliphatic carboxylic acid that constitutes an alkaline earth metal salt of an aliphatic carboxylic acid (E) of the embodiment of the present invention may be a saturated aliphatic carboxylic acid or an unsaturated aliphatic carboxylic acid. Such an aliphatic carboxylic acid may be exemplified by aliphatic monocarboxylic or dicarboxylic acids having 10 or more carbon atoms, for example, saturated aliphatic monocarboxylic acids having 10 or more carbon atoms [saturated aliphatic carboxylic acids having 10 to 34 carbon atoms (preferably, saturated aliphatic carboxylic acids having 10 to 30 carbon atoms) such as capric acid, lauric acid, myristic acid, pentadecylic acid, palmitic acid, stearic acid, arachic acid, behenic acid, and montanic acid, and the like], unsaturated aliphatic monocarboxylic acids having 10 or more carbon atoms [unsaturated aliphatic carboxylic acids having 10 to 34 carbon atoms (preferably, unsaturated aliphatic carboxylic acids having 10 to 30 carbon atoms) such as oleic acid, linoleic acid, linolenic acid, arachidonic acid, and erucic acid, and the like], aliphatic dicarboxylic acids (dibasic aliphatic carboxylic acids) having 10 or more carbon atoms [saturated aliphatic dicarboxylic acids having 10 to 30 carbon atoms (preferably, saturated aliphatic dicarboxylic acids having 10 to 20 carbon atoms) such as sebacic acid, dodecanoic acid, tetradecanoic acid, and thapsic acid, and the like], unsaturated aliphatic dicarboxylic acids having 10 or more carbon atoms [unsaturated aliphatic dicarboxylic acids having 10 to 30 carbon atoms (preferably, unsaturated aliphatic dicarboxylic acids having 10 to 20 carbon atoms) such as decenedioic acid and dodecenedioic acid, and the like].

In addition, the aliphatic carboxylic acids mentioned above include aliphatic carboxylic acids having a part of the hydrogen atoms thereof substituted with a substituent such as a hydroxyl group and hence having a single hydroxyl group or a plurality of hydroxyl groups, etc. within the molecule (for example, hydroxy-saturated aliphatic carboxylic acids having 10 to 26 carbon atoms such as 12-hydroxystearic acid), and may additionally contain aliphatic carboxylic acids having a somewhat different number of carbon atoms depending on the accuracy of the purification.

In the embodiment of the present invention, the alkaline earth metal is preferably calcium or magnesium, and particularly preferably calcium. In the embodiment of the present invention, examples of a particularly preferable alkaline earth metal salt of an aliphatic carboxylic acid include calcium stearate, and calcium 12-hydroxystearate.

The amount of the added alkaline earth metal salt of an aliphatic carboxylic acid added in the polyacetal resin composition with respect to 100 parts by mass of the polyacetal polymer (A) is 0.001 to 0.30 parts by mass, and preferably 0.01 to 0.25 parts by mass.

<Other Additives>

A compound selected from a metal oxide and a metal hydroxide may be further added to the polyacetal resin composition of the embodiment of the present invention to improve thermal stability, long-term thermal stability, etc. The amount of the compound added with respect to 100 parts by mass of the polyacetal polymer (A) is preferably 0.01 to 1 part by mass.

As the metal oxide and the metal hydroxide, calcium oxide, magnesium oxide, zinc oxide, calcium hydroxide, magnesium hydroxide and the like are preferable.

At least one type of mold release agent selected form an aliphatic carboxylic acid ester, an aliphatic carboxylic acid amide, a polyoxyalkylene glycol, and a silicone compound may be, and preferably is, further added to the polyacetal resin composition of the embodiment of the present invention to improve its molding processability, etc. The amount of the mold release agent added with respect to 100 parts by mass of the polyacetal polymer (A) is preferably 0.01 to 1 part by mass.

One or two or more of a weather (light) stabilizer, an impact resistance modifier, a glossiness control agent, a slidability modifier, a filler, a coloring agent, a nucleating agent, an antistatic agent, a surfactant, an antimicrobial agent, an antifungal agent, an aromatic agent, a foaming agent, a compatibilizer, a physical property modifier (boric acid or a derivative thereof, etc.), a fragrance, and the like may be further added to the polyacetal resin composition of the embodiment of the present invention as needed, so long as the present invention is not inhibited.

A production method of the polyacetal resin composition of the embodiment of the present invention is not particularly limited, and the polyacetal resin composition can be prepared according to various methods conventionally known as a preparation method of resin compositions. For example, the following methods can be employed: (1) a method in which all the components constituting the composition are mixed, and the mixture is fed to an extruder and melt-kneaded to obtain the composition in pellet form; (2) a method in which some of the components constituting the composition are fed from a main feed port of an extruder, and the remaining components are fed from a side feed port, and the total mixture is melt-kneaded to obtain the composition in pellet form; (3) a method in which pellets with different compositions are once prepared by extrusion or the like, and then the pellets are mixed to adjust the composition to a predetermined level; and the like.

In preparing the composition using an extruder, it is preferable to use an extruder having one or more devolatilizing vent openings, and further to feed water or a low-boiling-point alcohol in an amount of about 0.1 to 10 parts by mass with respect to 100 parts by mass of the polyacetal polymer at any position from a main feed port to the devolatilizing vent openings, and to devolatilize and remove formaldehyde and other substances generated in the extrusion step, from the devolatilizing vent openings together with water or the low-boiling-point alcohol. This can further reduce the amount of formaldehyde generated from the polyacetal resin composition and a molded article thereof.

The polyacetal resin composition of the embodiment of the present invention prepared in this manner can be molded by various conventionally known molding methods, such as injection molding, extrusion molding, compression molding, vacuum molding, blow molding, and foam molding.

<Automobile Interior Component>

An automobile interior component according to an embodiment of the present invention includes not only components visually observed in an automobile cabin, but also all automobile components which are made from a polyacetal resin, located near an automobile cabin and affect the amount of formaldehyde in the automobile cabin, for example, a carrier plate of a window regulator inside the door, and the like.

Specifically, air conditioner ventilators, inner handles, openers for fuel lids and the like, assist grips, seat belt components, seat mechanism components such as levers, clips, shift lever components, inner mirror components, mechanism components around the accelerator pedal, sun visors, sunroofs, glove box components, contour mat components, window regulator components, door lock components, various switch components such as switch knobs, wiper motor components, audio equipment such as speaker grills and car navigation equipment, cup holders, console boxes, and other vehicle-mounted components are mentioned.

EXAMPLES

Hereinafter, the present invention is specifically explained by way of Examples, but the present invention is not limited thereto. The properties evaluated in Examples and Comparative Examples and the evaluation methods therefor are as described below. The numerical values of the components (A) to (E) in the Tables 1 and 2 are expressed in parts by mass.

The various components shown in Tables 1 and 2 were added and mixed in the proportions shown in Tables 1 and 2, and melt-kneaded in a vented twin-screw extruder to prepare a composition in pellet form. The components used in Examples and listed in the tables are as follows:

Polyacetal Polymer (A)
- A-1: polyacetal copolymer obtained by copolymerizing 96.7% by mass of trioxane with 3.3% by mass of 1,3-dioxolane (melt index (measured at 190° C. under a load of 2.16 kg): 9 g/10 min)

Hindered Phenol Antioxidant (B)
- B-1: ethylenebis(oxyethylene) bis[3-(5-t-butyl-4-hydroxy-m-tolyl)propionate] (IRGANOX 245: from BASF)
- B-2: pentaerythritol tetrakis[3-(3,5-di-t-butyl-4-hydroxyphenyl)propionate] (IRGANOX 1010: from BASF)

Aliphatic Carboxylic Acid Hydrazide Compound (C)
- C-1: sebacic acid dihydrazide
- C-2: adipic acid dihydrazide
- C-3: dodecanedioic acid dihydrazide Hydantoin Compound Having Two Hydrazinocarbonylalkyl Groups (D)
- D-1: 1,3-bis(hydrazinocarbonoethyl)-5-isopropylhydantoin ("AJICURE" VDH from Ajinomoto Fine-Techno Co., Inc.)

Alkaline Earth Metal Salt of Aliphatic Carboxylic Acid (E)
- E-1: calcium stearate
- E-2: calcium 12-hydroxystearate Evaluation The property evaluation items and evaluation methods in Examples are as follows.

<Evaluation of Mold Deposits (MD) under High-Temperature Molding Conditions>

The polyacetal resin compositions prepared in Examples and Comparative Examples were each used to form mold deposit test pieces (33 mm×23 mm×1 mmt) under the conditions described below.

[Evaluation Method]

After 5,000 shots of continuous molding, the surface of the cavity in the mold was visually observed, and the amount of adhering materials was visually judged in accordance with the following criteria:
A: No adhering material was observed at all. B: Almost no adhering material was observed. C: Adhering materials were partially observed. D: Adhering materials were observed throughout the entire surface. E: A large amount of adhering materials were observed throughout the entire surface.

Molding machine: FANUC ROBOSHOT S-2000i 50B (FANUC CORPORATION)

Molding conditions: cylinder temperature (° C.)

| nozzle - | C1 - | C2 - | C3 |
|---|---|---|---|
| 210 | 220 | 210 | 190° C. |

| Injection pressure | 40 (MPa) |
|---|---|
| Injection speed | 1.5 (m/min) |
| Mold temperature | 80 (° C.) |

<Evaluation of Formaldehyde Generation (VOC) from Molded Article Molded under High-Temperature Molding Conditions>

The polyacetal resin compositions prepared in Examples and Comparative Examples were each used to mold flat test pieces (100 mm×40 mm×2 mmt) under the conditions described below. Two of these flat test pieces were sealed in a 10 L sampling bag made from polyvinyl fluoride, and the sampling bag was degassed, and 4 L of nitrogen gas was charged thereinto. The bag was heated at 65° C. for 2 hours, then 3 L of the nitrogen inside the sampling bag was taken out at a rate of 0.5 mL/min, and the generated formaldehyde was allowed to be adsorbed on a DNPH (2,4-dinitrophenylhydrazine) collecting tube (Sep-Pak DNPH-Silica from Waters).

Subsequently, the reaction product of DNPH and formaldehyde was extracted from the DNPH collecting tube with acetonitrile, and the amount of the generated formaldehyde was determined according to a calibration curve method using a standard of the reaction product of DNPH and formaldehyde using a high performance liquid chromatograph. Then, the amount of the generated formaldehyde (μg/g) per unit mass of the test piece was calculated.

Molding machine: FANUC ROBOSHOT α-S100ia (FANUC CORPORATION)

Molding conditions: cylinder temperature (° C.)

| nozzle - | C1 - | C2 - | C3 |
|---|---|---|---|
| 210 | 220 | 210 | 190° C. |

| Injection pressure | 60 (MPa) |
|---|---|
| Injection speed | 1.0 (m/min) |
| Mold temperature | 80 (° C.) |

<Bleed-Out Properties>

The polyacetal resin compositions prepared in Examples and Comparative Examples were each used to mold flat test pieces (70 mm×40 mm×3 mmt) under the conditions described below. These flat test pieces were treated for 48 hours under the condition of 65° C. and 95% RH as a typical temperature and humidity environment of automobile cabins. Then, the surface of the molded articles after the treatment was visually observed, and the amount of the bleed-out was evaluated in accordance with the following criteria:
A: No bleed-out was observed at all.
B: A small amount of bleed-out was observed.
C: A moderate amount of bleed-out was observed.
D: A considerable amount of bleed-out was observed.
E: Bleed-out was observed over the entire surface of the test piece.

Molding machine: FANUC ROBOSHOT α-S100ia (FANUC CORPORATION)

Molding conditions: cylinder temperature (° C.)

| nozzle - | C1 - | C2 - | C3 |
|---|---|---|---|
| 190 | 190 | 180 | 160 |

| | |
|---|---|
| Injection pressure | 60 (MPa) |
| Injection speed | 1.0 (m/min) |
| Mold temperature | 80 (° C.) |

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| (A) | Polyacetal polymer | A-1 | 100 | 100 | 100 | 100 | 100 | 100 | 100 | 100 | 100 | 100 | 100 | 100 |
| (B) | Hindered phenol antioxidant | B-1 | 0.3 | 0.3 | 0.3 | 0.3 | 0.3 | 0.3 | 0.3 | 0.3 | 0.3 | | 0.3 | 0.3 |
| | | B-2 | | | | | | | | | | 0.3 | | |
| (C) | Aliphatic carboxylic acid hydrazide | C-1 | 0.25 | 0.25 | 0.35 | 0.05 | 0.25 | 0.30 | 0.25 | 0.25 | 0.10 | 0.25 | | |
| | | C-2 | | | | | | | | | | | 0.25 | |
| | | C-3 | | | | | | | | | | | | 0.25 |
| (D) | Hydantoin compound having two hydrazino-carbonylalkyl groups | D-1 | 0.05 | 0.05 | 0.05 | 0.45 | 0.25 | 0.005 | 0.05 | 0.05 | 0.03 | 0.05 | 0.05 | 0.05 |
| (E) | Alkaline earth metal salt of aliphatic carboxylic acid | E-1 | 0.05 | | 0.05 | 0.05 | 0.05 | 0.05 | 0.2 | 0.005 | 0.05 | 0.05 | 0.05 | 0.05 |
| | | E-2 | | 0.05 | | | | | | | | | | |
| Mold deposits under high-temperature molding conditions (MD) | | | A | A | A | A | A | A | A | A | A | A | B | B |
| Formaldehyde generation from molded article formed under high-temperature molding conditions (VOC) (µg/g) | | | 0.04 | 0.07 | 0.02 | 0.05 | 0.03 | 0.03 | 0.08 | 0.03 | 0.09 | 0.04 | 0.05 | 0.06 |
| Bleed-out properties | | | A | A | B | A | A | B | A | A | A | A | B | B |

TABLE 2

| | | | Comparative Example | | | | | | |
|---|---|---|---|---|---|---|---|---|---|
| | | | 1 | 2 | 3 | 4 | 5 | 6 | 7 |
| (A) | Polyacetal polymer | A-1 | 100 | 100 | 100 | 100 | 100 | 100 | 100 |
| (B) | Hindered phenol antioxidant | B-1 | 0.3 | 0.3 | 0.3 | 0.3 | 0.3 | 0.3 | 0.3 |
| | | B-2 | | | | | | | |
| (C) | Aliphatic carboxylic acid hydrazide | C-1 | 0.25 | | 0.55 | 0.005 | 0.45 | 0.25 | 0.25 |
| | | C-2 | | | | | | | |
| | | C-3 | | | | | | | |
| (D) | Hydantoin compound having two hydrazinocarbonylalkyl groups | D-1 | | 0.60 | 0.05 | 0.50 | 0.25 | 0.05 | 0.10 |
| (E) | Alkaline earth metal salt of aliphatic carboxylic acid | E-1 | 0.05 | 0.05 | 0.05 | 0.05 | 0.05 | | 0.5 |
| | | E-2 | | | | | | | |
| Mold deposits under high-temperature molding conditions(MD) | | | D | D | E | D | E | E | C |
| Formaldehyde generation from molded article formed under high-temperature molding conditions (VOC) (µg/g) | | | 0.09 | 0.06 | 0.05 | 0.07 | 0.03 | 0.08 | 1.00 |
| Bleed-out properties | | | E | C | E | C | E | D | C |

As described above, it is clear that the composition within the scope of the present invention allows for stable suppression of the generation of mold deposits during molding at elevated temperatures, and the reduction of the amount of formaldehyde generated from a molded article to an extremely low level, as well as the prevention of the bleed-out of an added component from the molded article, and the retention of a favorable appearance of the molded article.

The invention claimed is:

1. An automobile interior component, wherein the automobile interior component is obtained using a polyacetal resin composition comprising, at least:
   100 parts by mass of a polyacetal polymer (A) obtained by copolymerizing 96.7% by mass of trioxane and 3.3% by mass of 1,3-dioxolane;
   0.03 to 0.30 parts by mass of a hindered phenol antioxidant (B) selected from the group consisting of ethylenebis(oxyethylene) bis[3-(5-t-butyl-4-hydroxy-m-tolyl)propionate] and pentaerythritol tetrakis[3-(3,5-di-t-butyl-4-hydroxyphenyl)propionate];
   0.05 to 0.35 parts by mass of an aliphatic carboxylic acid hydrazide (C) selected from the group consisting of sebacic acid dihydrazide, adipic acid dihydrazide and dodecanedioic acid dihydrazide;
   0.005 to 0.45 parts by mass of a hydantoin compound 1,3-bis(hydrazinocarbonoethyl)-5-isopropylhydantoin (D); and
   0.005 to 0.20 parts by mass of an alkaline earth metal salt of an aliphatic carboxylic acid (E) selected from the group consisting of calcium stearate and calcium 12-hydroxystearate, wherein
   a total amount of the components (C) and (D) is 0.055 to 0.55 to parts by mass with respect to 100 parts by mass of the polyacetal polymer (A).

* * * * *